Feb. 6, 1968     W. H. HULTGREN     3,367,507
FILTER UNIT
Filed April 8, 1965
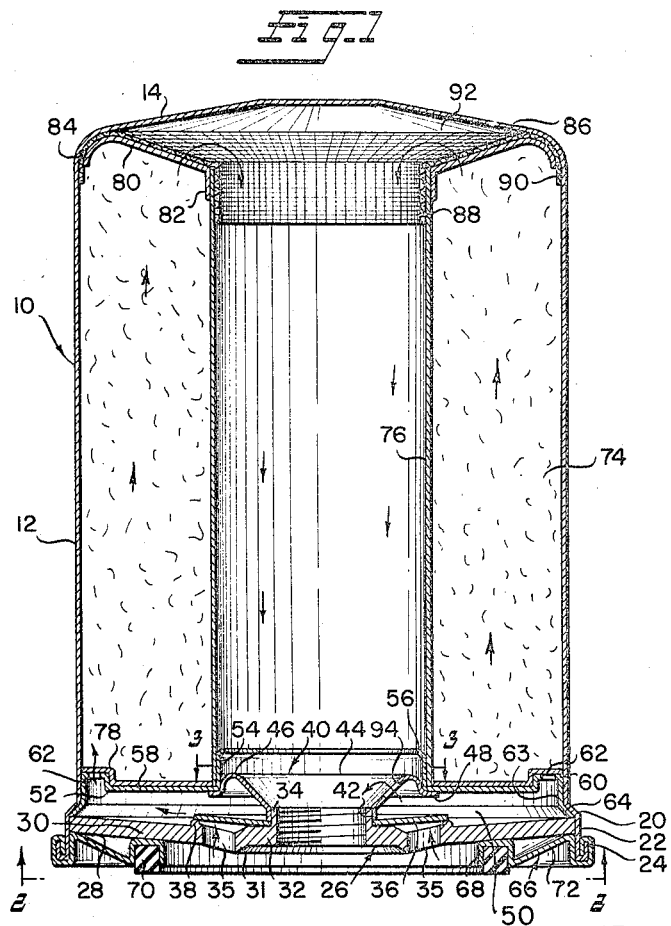
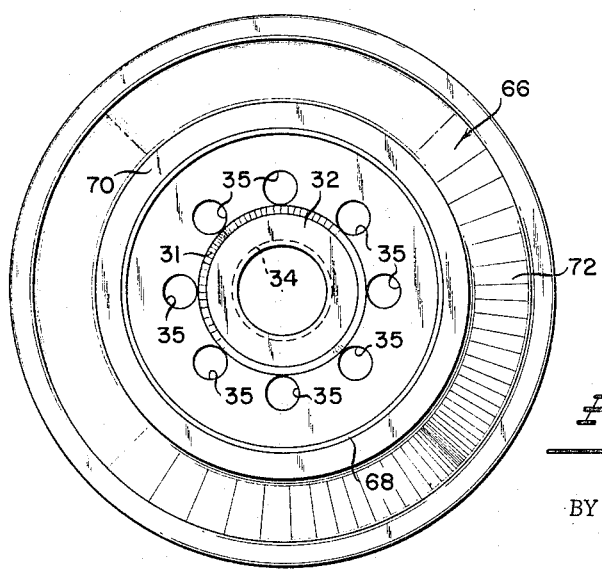
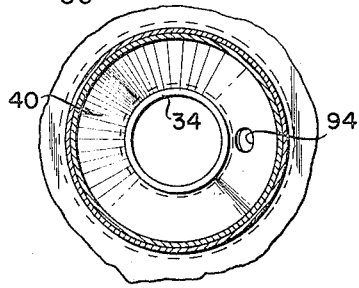
INVENTOR
*William H. Hultgren*
BY *Wuter + Trickman*
ATTORNEY

United States Patent Office 3,367,507
Patented Feb. 6, 1968

3,367,507
FILTER UNIT
William H. Hultgren, Mount Carmel, Ill., assignor to Champion Laboratories, Inc., West Salem, Ill., a corporation of Connecticut
Filed Apr. 8, 1965, Ser. No. 446,645
1 Claim. (Cl. 210—434)

The present invention relates to a filter, and more particularly to a filter utilized for purifying and conditioning fluids, such as oils and the like.

The present invention further relates to an oil filter that is commonly known as a spin-on or screw-on type oil filter which is adapted to be mounted on the engine block of an internal combustion engine, although it is not to be limited to this particular use since it is apparent that it can be used in many other systems, if desired. However, for purposes of illustration only, the oil filter of the present invention will be described in connection with its use for filtering the oil in an internal combustion engine.

In an oil filter, the filter unit must be capable of passing oil to the surfaces to be lubricated at the maximum rate required under any set of operating conditions, at all times. It is necessary that provision be made in the filter unit for bypassing oil around the filtering element or cartridge whenever flow through the element is impeded or interrupted for any reason, or there is undue restriction through the filter element such as an excessive pressure drop thereacross.

The bypassing of unfiltered oil through the filter element can be avoided by changing the filter unit before the filter element becomes so clogged with dirt and contaminants that it becomes unable to permit a sufficient flow of oil therethrough to properly lubricate the engine parts. However, even if the filter unit were clean and not clogged, since the oil is more viscous during cold starting or initial starting of an engine, if all of the oil has to flow through the filter cartridge or elements, due to the viscosity, sufficient oil may not be supplied to properly lubricate the engine parts.

In accordance with the present invention one object is to provide a spin-on type oil filter unit provided with means for permitting the oil to bypass the filter element upon cold starting of an engine.

It is a further object of the present invention to provide a filter unit of a spin-on type for an internal combustion engine with a filter cartridge therein and bypass port means for supplying sufficient oil to the engine should the filter cartridge be clogged for any reason whatsoever.

It is another object of the present invention to provide a filter unit that can be readily discarded when the filter element becomes clogged, and which filter unit has shunt means therein which will permit a predetermined quantity of oil to flow around the filter cartridge so that the oil filter will always enable enough oil to flow through the internal combustion engine to properly lubricate the engine parts.

It is another object of the present invention to provide a spin-on type oil filter unit that has an oil filter cartridge therein and a shunt circuit therein through which the oil flows so that the engine is never starved of lubricating oil and which shunt circuit permits the oil to flow into the front end of the filter unit and back out the front end of the filter unit so as to completely short circuit the usual flow path through the filter cartridge disposed therein.

It is another object of the present invention to provide a filter unit having a filter element therein in which the flow through the filter element is in a longitudinal direction from the front end of the filter unit parallel to the center tube means, instead of the usual radial flow direction of filter cartridges utilized heretofore.

It is another object of the present invention to provide a spin-on type filter unit having means for mounting a depth type filter element therein with an inlet end adjacent the front end of the filter unit and an outlet end adjacent the rear end of the filter unit after which the filtered oil flows through the center tube means and back into the engine proper.

It is another object of the present invention to provide a filter unit having a depth type annular filter cartridge therein with shunt means disposed adjacent the front end of the filter unit so as to bypass the filter cartridge should the filter media become unduly clogged or plugged, or should it be unduly restricted due to cold starting of an engine.

It is another object of the present invention to provide a filter unit having a depth type filter cartridge that is made up of a plurality of discrete particles with means for preventing disintegration of the particles, or carrying of any of the particles downstream of the discharge side of the filter cartridge.

In accordance with the present invention a casing is provided with a bottom member having a threaded nipple or bushing member for threading onto an adapter bushing secured to the engine block of an internal combustion engine. Resilient sealing means are provided in the bottom member for bearing against an adapter member secured to the engine block so that the filter unit is sealed with respect to the engine block, and no oil will leak out of the system between the engine block and the resilient sealing means.

The individual filter cartridge is of an annular configuration and is a depth type filter, which may consist of a fibrous mass, chopped paper particles, sisal and the like. The filter cartridge is disposed around a center tube that is a solid member and is not perforated. The inlet and outlet ends of the filter cartridge are provided with means, so as to prevent any of the individual particles from becoming loosened or separated from the filter mass. The filter unit of the present invention is also provided with shunt means adjacent the bottom member which bottom member has inlet ports and outlet port means so that the oil can completely bypass the filter cartridge or short circuit the usual flow path through the filter unit under certain conditions. The peripheral portion of the filter cartridge is encased within the filter housing or casing so that the flow through the filter cartridge is in a longitudinal direction from the front end of the filter toward the rear end of the filter after which the filtered oil flows out of the filter casing after passing through the center tube. This structure eliminates the need for a bypass valve means.

Various other advantages and objects of the present invention will be readily apparent from the following detailed description when considered in connection with the accompanying drawing forming a part thereof and in which:

FIGURE 1 is a vertical section taken through the oil filter unit embodying the present invention;

FIGURE 2 is a view taken along the line 2—2 of FIGURE 1 and FIGURE 3 is a view taken along the line 3—3 of FIGURE 1.

Referring to the drawing, the reference numeral 10 generally designates an oil filter or filter unit, provided with a thin walled cylindrical metal casing or housing 12. The upper end of the casing is provided with a closed domed shaped end 14. The lower end of the casing is open and is flared outwardly at 20 and thereafter has a vertical downwardly extending rim 22 which terminates in a vertical rolled seam 24 bent back upon itself as is best shown in FIGURE 1.

The oil filter is provided with a bottom member 26 which is preferably made of metal and is substantially thicker than the cylindrical casing 12 and is of circular configuration. Bottom member 26 has its circumference of sufficient size or diameter so that the vertical rim 22 of the casing bears against its circumference. The peripheral portion 28 of the bottom member 26 is inclined slightly downwardly and inwardly toward its central portion 30, and is inclined downwardly and at a steeper angle at 31, and thereafter extends horizontally at 32 adjacent its center after which it extends vertically upwardly to provide a bushing or nipple 34 disposed centrally thereof. The nipple 34 is internally threaded and is adapted to be threaded or screwed onto an adapter bushing or member, not shown, which is secured to the engine block of an internal combustion engine. The portion of the bottom member 26 between 28 and 32 is provided with a plurality of circumferentially spaced oil inlet openings or ports 35 through which oil from the engine flows into the filter casing 12. The horizontal portion 32 provides a surface or seat on the bottom member 26 around nipple 34 for mounting an annular valve 36 around the nipple. The valve or valve disc 36 is made of resilient material, and has its outer edge adapted to seat upon a circular rim or bead 38 formed on the bottom member. A sleeve 40 is disposed on the nipple 34 and has a cylindrical lower portion 42 which bears against the inner end of the valve disc 36. The valve disc 36 is a one way valve and permits flow of oil through the oil ports 35 while acting as an anti-drain valve to prevent flow through the oil ports in the other direction, once the oil has entered the interior of the casing 12.

The upper end of the sleeve 40 is provided with an outwardly flared or conical section or portion 44 and is provided with a rib 46 adjacent its upper end. The rib 46 consists of an arcuate portion bent back upon itself and terminating in an outwardly extending annular rim 48 which is disposed in spaced relationship with the bottom member 26 and the anti-drain back valve disc 36 so as to provide an oil inlet chamber 50 in the bottom of the filter unit, or the front end thereof.

A filter cartridge support member 52 is disposed on the rim 48. The support member 52 has a cylindrical vertical rim 54 with an inwardly flared tip 56 adjacent its upper end to provide a central opening therein. The lower end of 54 is provided with an annular horizontal section 58. The outer portion of the section 58 is provided with an upwardly extending rib 60 having a plurality of circumferentially spaced oil inlet openings or ports 62 therein. The support member 52 terminates adjacent its outer edge with a vertical downwardly extending portion 63 and an outwardly flared portion 64 corresponding to the portions 12 and 20 of the casing so that the support member will not be inadvertently positioned within the casing but will be disposed contiguous to the portion 20 and abutting the bottom member 26.

A metal retainer plate 66 is secured to the outer surface of the bottom member 26. Retainer plate 66 is of annular configuration and is secured to bottom member 26 by tack-welding, spot-welding, soldering or any other suitable means. Retainer plate 66 is disposed adjacent the peripheral portion 28 of the bottom member 26 and is provided with a continuous groove or recess 68 adjacent its inner periphery for receiving therein a resilient ring gasket member 70, preferably of rubber, which bears against the engine block or the engine block adapter member when the oil filter unit is secured thereto. The resilient gasket member is substantially square in cross section and the recess in which it is disposed is of substantially the same configuration so that the gasket member can be press fitted therein and a substantial portion of the gasket member can extend below or project outwardly of the recess as best seen in FIGURE 1.

The gasket member and the recess are both disposed or laterally positioned in a direction outwardly of and beyond the oil inlet ports 35. The gasket member prevents any oil leakage between the oil filter unit and the engine block. The retainer plate 66 extends diagonally upwardly at 72 from the adjacent outer leg of the recess 68 and bears against the outer surface of the bottom member 26 adjacent the vertical rim 22. The retainer plate 66 thereafter extends downwardly and upwardly, and is bent around the rolled seam 24 of the casing 12 so as to provide a liquid tight roll seam therewith. The retainer plate locks the bottom member 26 against the flared portion 64 so as to secure the filter support member 52 in a proper position within the casing 12.

The oil filter element or cartridge is generally designated as 74 and consists of an annular mass of depth type filter material, such as treated chopped resin impregnated paper, sisal, or other similar materials. The filter element is an elongated annular member disposed between the inner surface of the casing 12 and a non-perforated center tube 76 disposed centrally of the casing 12 and having its lower end seated on the filter support member 52 adjacent the rib 46. An annular disc 78 preferably made of resin impregnated filter paper or felt is disposed on the support member 52 adjacent the horizontal section 58 and the rib 60 so as to confine the fibrous material or the chopped paper of the filter element 74 within the support member 52. The upper end of the filter cartridge is also provided with an annular disc 80 made of resin impregnated paper or felt so as to prevent any of the discrete particles of the fibrous filter mass from becoming loosened and carried downstream with the purified oil. The disc 80 has an inner inwardly extending rim 82 and a curved outer rim 84. An annular foraminous member 86 or perforated metal disc preferably made of wire mesh cloth or screen with an inturned flange 88 and a curved inturned flange 90 is disposed over the annular disc 80 for supporting the disc. The inner portion 88 fits over the inner end of the center tube 76 while the outer flange 90 is disposed between the rim 84 and the inner surface of the casing wall. It will be noted that the upper end of the filter element 76 is inclined downwardly and away from the dome or top 14 of the casing so as to provide a clean oil discharge chamber 92 in the casing in communication with the upper end of the center tube 76.

Referring to FIGURE 3 it will be seen that the sleeve 40 is provided with a single opening or aperture or bypass port 94 therein in the conical portion 44 of the sleeve. The port or shunt opening 94 is of a diameter that is designed to supply enough oil to the engine bearings even when the filter cartridge 74 is plugged or clogged and the oil stops flowing thereto. All the oil above that required for the engine needs, as determined by the shunt restriction, flows through the filter media in the cartridge 74 when a clean filter cartridge is installed, or when the plugged filter unit is unthreaded from the engine block and replaced with another throwaway filter unit.

In operation of the present invention, oil to be filtered passes from the internal combustion engine or machine through oil inlet ports 35 and the oil pressure causes the valve disc 36 to lift from its seated position to permit the oil to flow into the oil inlet chamber 50. The oil thereafter flows through the ports 62 upwardly through the filter media forming the filter cartridge 74. It will be noted that since the center tube 76 is a solid member and does not have any openings or perforations therein the oil flow is in a longitudinal direction away from the front end of the filter unit and the bottom member 26 to the downstream end of the filter cartridge, which is the portion adjacent the upper end of the casing 12. The clean oil thereafter flows out of the top of the filter cartridge and into the discharge chamber 92 after which it then flows downwardly in the center tube 76 and through the conical portion 44 and the adapter nipple 34 and back into the engine.

Should the filter cartridge 74 become clogged or contaminated with the dirt particles removed from the oil so that there is an excessive pressure drop thereacross, or the flow through the filter cartridge becomes unduly restricted, then the oil flowing through the oil inlet ports 35 will pass into the inlet chamber 50 as before. Thereafter the oil will flow through the shunt circuit through the shunt oil port 94 and out of the threaded nipple 34 back into the engine. The shunt hole is of sufficient size so as to supply enough oil to the bearings even when the filter media is completely plugged and stops flowing entirely.

With this structure it is apparent that the present invention provides an oil filter unit having means for bypassing the filter cartridge should it become clogged either due to contamination, or when the oil is very viscous such as upon cold starting, so that the engine will always have a sufficient amount of oil to properly lubricate the engine parts.

It is another feature of the present invention to provide an oil filter unit that is of the throw away screw-on type with a short circuit feature so that when the oil filter cartridge is bypassed, there is no carrying downstream of caked material on the oil cartridge, as has occurred frequently heretofore with other types of filters.

The present invention further provides an oil filter unit that permits bypassing of the oil filter cartridge without requiring the need for a conventional bypass valve and hence the throw away type bypass arrangement of the present structure eliminates the cost of such a bypass valve.

The present invention also provides an oil filter cartridge structure in which the flow of the oil therethrough is in a longitudinal direction with respect to the cartridge so that there is a prolonged filtering action and a much more thorough filtering action than if the flow of oil was in a radial direction through the cartridge.

Inasmuch as various changes may be made in the form, location and relative arrangement of the several parts without departing from the essential characteristics of the invention, it will be understood that the invention is not to be limited except by the scope of the appended claim.

What is claimed is:

1. A spin-on oil filter unit comprising a cylindrical casing open at one end, a circular bottom plate closing off said open end having an inturned threaded nipple extending into said casing, said nipple providing both an oil outlet and means for securing said filter unit onto an engine block, oil inlet port means located in said plate and surrounding said nipple, a sleeve mounted over said nipple with an upper outwardly flared section and a substantially horizontal rim around said section, an annular filter support member with a central opening having a portion seated on said rim and having an outer circumferential portion contiguous to the inner surface of said casing and extending downwardly onto said plate, an oil inlet chamber formed between said filter support member and said plate, a cylindrical non-perforated center tube having one end seated on said rim and its other end extending upwardly in said casing to a point in spaced relationship with the closed end of said casing, a mass of filter material filling the space in said casing between the outer surface of said center tube and the inner surface of said casing and adjacent said annular member and extending upwardly in said casing to a point in spaced relationship with said closed end of said casing to form a longitudinally extending depth type filter element, a perforated end cap secured against the upper surface of the filter material and spaced from the closed end of the casing, said annular member having circumferentially spaced oil inlet ports adjacent the inner surface of said casing to provide longitudinal flow through said filter material, said flared section having at least one unobstructed opening therein in direct communication with said nipple and said oil inlet chamber to continuously by-pass oil around said filter material.

References Cited

UNITED STATES PATENTS

| 2,248,131 | 7/1941 | Smith | 210—496 |
|---|---|---|---|
| 2,253,684 | 8/1941 | Burckhalter | 210—133 |
| 2,622,737 | 12/1952 | Balley | 210—440 X |
| 2,833,416 | 5/1958 | Wilkinson | 210—130 |
| 2,850,168 | 9/1958 | Nostrand | 210—176 |
| 2,888,141 | 5/1959 | Coates et al. | 210—443 X |
| 2,895,615 | 7/1959 | Oathout | 210—439 |
| 3,000,506 | 9/1961 | Hultgren | 210—133 |
| 3,036,711 | 5/1962 | Wilhelm | 210—130 |
| 3,232,437 | 2/1966 | Hultgren | 210—440 |
| 3,233,737 | 2/1966 | Hultgren | 210—434 |
| 3,272,336 | 9/1966 | Humbert | 210—132 |
| 3,272,342 | 9/1966 | McLaren et al. | 210—136 X |

FOREIGN PATENTS

| 683,247 | 3/1964 | Canada. |
|---|---|---|
| 1,010,782 | 6/1957 | Germany. |
| 752,827 | 7/1956 | Great Britain. |
| 549,083 | 10/1956 | Italy. |

REUBEN FRIEDMAN, *Primary Examiner.*

W. S. BRADBURY, *Assistant Examiner.*